G. J. OLTSCH.
FISHING REEL.
APPLICATION FILED SEPT. 26, 1921.
1,426,594.
Patented Aug. 22, 1922.
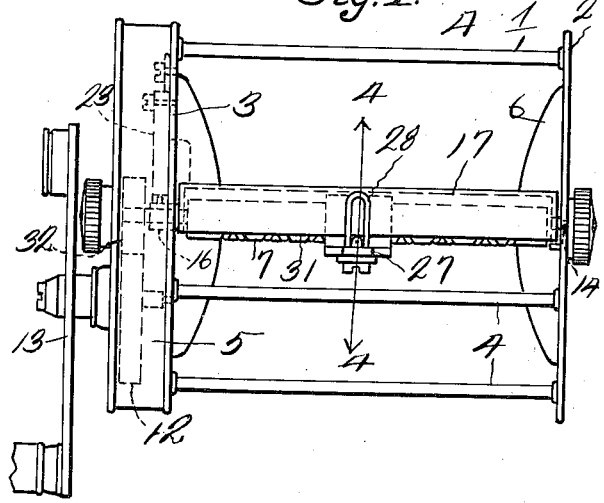
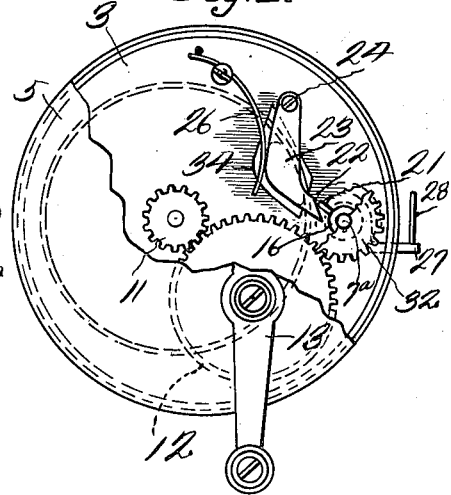
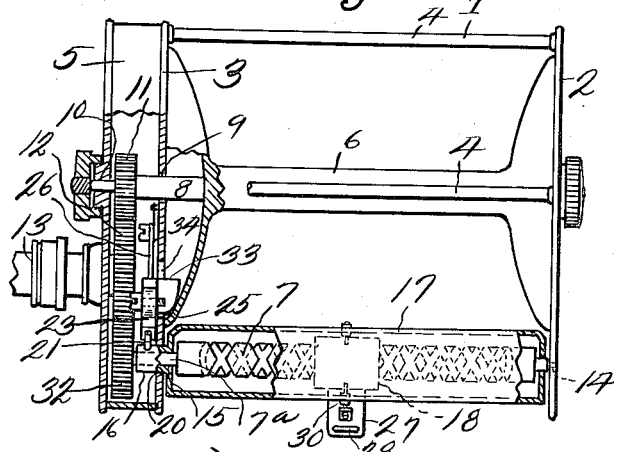
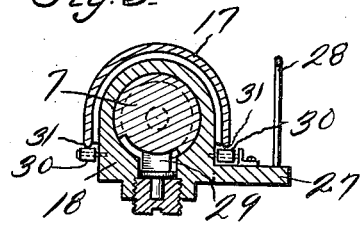
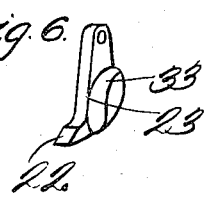
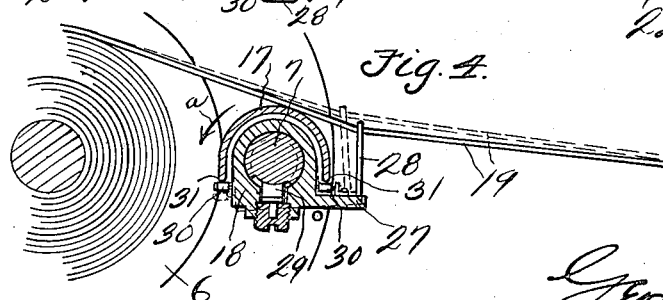
INVENTOR.
George J. Oltsch

UNITED STATES PATENT OFFICE.

GEORGE J. OLTSCH, OF SOUTH BEND, INDIANA.

FISHING REEL.

1,426,594.                   Specification of Letters Patent.    Patented Aug. 22, 1922.

Application filed September 26, 1921. Serial No. 503,364.

*To all to whom it may concern:*

Be it known that I, GEORGE J. OLTSCH, a citizen of the United States, residing at South Bend, in the county of St. Joseph and State of Indiana, have invented certain new and useful Improvements in Fishing Reels, of which the following is a specification.

The invention relates to fish-line reels, and has for its object to provide a fish-line reel of a level winding and antiback-lash type wherein the reel is normally held against easy rotation by means of a spring actuated brake when the fish-line is slack and released and allowed to easily rotate when the fish line is taut, as for instance during casting or winding the line on the reel.

A further object is to provide a fish-line reel comprising a frame having rotatably mounted therein a fish-line reel and a reversely threaded shaft in parallel relation to the reel on which shaft a carriage is longitudinally movable for level winding of the line on the reel, said carriage being provided with a loop through which the line extends. Also to provide a housing for said reversely threaded shaft, which housing is rockably mounted on the reversely threaded shaft and has one of its ends extending through the casing of the reel and provided with a pin cooperating with a spring actuated brake shoe, and so positioned that when the housing is rocked upwardly and inwardly by the tension of the line and the engagement of the carriage with the housing, said brake shoe will be moved to inoperative position. Also to provide gear means whereby the reversely threaded shaft and the reel may be simultaneously rotated for traversing the carriage and rotating the reel during a winding or unwinding operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of the fish line reel.

Figure 2 is a side elevation of the fish line reel, showing part of the side thereof broken away to better illustrate the reel, and carriage traversing mechanism.

Figure 3 is a top plan view of the reel, parts being broken away to better show the structure.

Figure 4 is a vertical sectional view through a portion of the reel, a housing and carriage, showing the carriage in rocked position in dotted lines for releasing the brake mechanism.

Figure 5 is a view in section through the carriage and rockable housing showing the position of the parts when the line is slack.

Figure 6 is a detail perspective view of the spring actuated brake shoe.

Referring to the drawings, the numeral 1 designates the frame of a reel, which frame comprises spaced plates 2 and 3 which are maintained in spaced relation to each other by means of rods 4. The plate 3 is provided with a housing 5, in which housing the driving mechanism for the reel 6 and the reversely threaded shaft 7 is disposed. The reel 6 is disposed between the plates 2 and 3 and has one of its pintles 8 rotatively mounted in a bearing 9 of the plate 3 and in a bearing 10 of a casing 5. Secured to the pintle 8 is a gear 11, which gear meshes with a drive gear 12 carried by an operating lever 13, which is adapted to be grasped by the operator for winding the reel 6.

The reversely threaded shaft 7 is mounted in a bearing 14 of the plate 2, and in a bearing 15 of the sleeve 16 of the housing 17 which houses the reversely threaded shaft 7. The housing 17 is open on its under side and has disposed therein and slidably mounted on the reversely threaded shaft 7 a carriage 18, which carriage traverses from one end of the shaft 7 to the other during a reeling operation thereby guiding the fish line 19 for level winding on the reduced portion of the reel 6. The sleeve 16 is mounted in the bearing 20 of the plate 3 and is provided with a radially disposed pin 21, which pin rests on the nose 22 of the pivoted spring actuated brake shoe 23, which is pivoted at 24, to the plate 3, as clearly shown in Figure 2. Under normal conditions the brake shoe 23 is held in engagement with the reel 6 at 25 by means of the spring 26, therefore the reel is frictionally held sufficiently to prevent over-running of the reel under normal conditions. The reel is normally held against easy rotation unless a pull is imparted on the line during a reeling operation or during a casting operation. The carriage 18 is provided with an outwardly extending arm 27 and extending upwardly from said arm is a line guide eye 28, through which eye the line 19 carried by the reel 6 extends. Carriage 18 is provided with a pivoted dog 29, which engages in the reverse threads of the shaft 7 and reverses the direction of the carriage 8 during a winding or unwinding operation. The carriage 8 is provided with roller bearings 30 which engage the lower edges 31 of the housing 17 and when a strain is placed on the fishing line 19, as for instance during a casing operation, at which time a brake shoe releasing is essential, the carriage 18 is rocked thereby causing the housing to rock in the direction of the arrow a and the pin 21 to rock in the same direction. When the pin 21 rocks in the direction of the arrow a, said pin will force the brake shoe 23 inwardly against the action of the spring 26 and consequently hold the shoe 23 out of frictional engagement with the reel 6 during a casting operation, and as soon as the strain is released on the line 19, the shoe 23 will be immediately moved into operative position upon the influence of the spring 26, thereby preventing over-running of the reel. During the operation of reeling in a fish, it is obvious that strain will be placed on the line 19 and consequently the brake shoe 23 will be held out of frictional engagement with the reel 6 and allow free rotation of the reel.

The reduced portion 7ª of the reversely threaded shaft 7 extends through the sleeve 16 in which it has a bearing and is provided with a gear 32 which meshes with the main drive gear 12. It will be seen that when the main drive gear 12 is rotated that the gears 11 and 32 will also rotate, consequently the reel 6 and the reversely threaded shaft will be simultaneously rotated, thereby insuring a level winding of the line on the reel, and at the same time allowing the operator to control the reeling operation.

From the above it will be seen that a reel is provided which is simple in construction, positive in its braking operation, and one wherein the use of a line actuated lever connected with a brake shoe is obviated, thereby allowing the braking action to gradually take place, and the brake shoe to be actuated through a rockable housing having a pin thereon, which housing houses the reversely threaded shaft. The brake shoe 23 is provided with an enlargement 33 which extends through an aperture 34 in the plate 3, the marginal edges of which aperture form limiting means for the inward movement of the shoe 23, thereby limiting the movement of the pin 21 in its movement in the direction of the arrow a and preventing the pin from moving out of engagement with the nose 22 of the brake shoe 23, and consequently limiting the upward and inward rocking movement of the housing 17.

The invention having been set forth what is claimed as new and useful is:—

1. A fishing line reel comprising a frame, a line reel rotatably mounted in said frame, a reversely threaded shaft rotatably mounted in bearings of said frame, a line traversing carriage mounted on said reversely threaded shaft, a housing over said reversely threaded shaft and rockable with the carriage, a line eye carried by the said carriage, a spring actuated brake shoe cooperating with the reel, and means actuated by the housing when rocked under strain on a line for releasing said brake shoe.

2. The combination with a reel having a simultaneously rotated line carriage shaft and a brake for the reel, of a housing rockably mounted on said line traversing shaft and provided with means whereby when the housing is rocked the brake will be released.

3. The combination with a reel having a rotatable line carriage shaft on which a line traversing carriage is mounted and reciprocated and a pivoted spring actuated brake shoe normally engaging the reel, of a housing rockably mounted on the line carried shaft and rockable with the line carried shaft, and means whereby upon a rocking movement of the housing the brake shoe will be moved to inoperative position.

4. The combination with a reel having a rotatable line carriage shaft on which a line traversing carriage is mounted and reciprocated during a reel operation, and a pivoted brake shoe normally and in operative engagement with the reel, of a housing semi-circular in cross section and rockably mounted concentrically with the rotatable line carried shaft, the longitudinal edges of said housing having anti-frictional engagement with the carriage, a line engaging loop carried by said carriage, and means carried by the housing whereby the brake shoe will be released when the carriage and housing are rocked.

5. The combination with a reel having a line carriage shaft on which a line traversing carriage is mounted and reciprocated during a reeling operation, and a pivoted brake shoe normally engaging the reel, of means for releasing said brake shoe when the line becomes taut, said means comprising an eye carried by the carriage through which the line passes, a housing arching the upper side of the line traversing shaft, said housing being rockably mounted on the shaft and provided with a sleeve in which one end of the shaft has a bearing, a pin carried by said sleeve and cooperating with the brake shoe, means for limiting the movement of the brake shoe for limiting the rockable movement of the housing, said carriage engaging the lower side of the housing and rocking therewith.

6. The combination with a fishing reel having a line reel and a line carriage traversing shaft in parallel relation thereto and simultaneously rotated, said reel having in connection therewith a spring actuated brake shoe normally in operative position, of a housing rockably mounted on the line carriage traversing shaft and rockable by the carriage, said housing being provided with means for engaging the shoe and releasing the same when the housing is rocked.

7. The combination with a fishing reel having a line reel and a line carriage traversing shaft simultaneously rotated, said reel having in connection therewith a spring actuated brake shoe normally in operative position, of a housing rockably mounted on the line carriage shaft and rockable with the carriage, said housing being provided with means for engaging the shoe and releasing the same when the housing is rocked, and means for limiting the movement of the shoe thereby limiting the movement of the housing.

8. The combination with a fishing reel having a line reel and a line carriage traversing shaft on which a line carriage is slidably mounted, said reel having in connection therewith a spring actuated brake shoe normally in operative position, of a housing rockably mounted for movement with the line carriage and having bearings on the carriage traversing shaft and actuated by the carriage, whereby upon a rocking of the carriage and housing the brake shoe will be released.

9. The combination with a fishing reel involving a reciprocating line guide operating simultaneously with the rotation of the spool thereof, of means for exerting a braking action on the spool actuated to a release position by a tilting movement of said guide.

10. The combination with a fishing reel having a simultaneously rotated line spool and a shaft on which a line traversing carriage is mounted and reciprocated thereby, of means for exerting a braking action upon the spool, and means actuated by a rocking of said carriage under the influence of the line for holding the braking means in inoperative position.

11. In combination, a fishing reel comprising a spool, a line traversing guide capable of having a simultaneous reciprocatory and tilting movement, means for exerting a braking action upon the spool, and means actuated by the tilting movement of the line guide as influenced by the playing out of the line for controlling the action of the braking means.

In testimony whereof I affix my signature.

GEORGE J. OLTSCH.